(12) United States Patent
Foster et al.

(10) Patent No.: US 12,385,767 B2
(45) Date of Patent: Aug. 12, 2025

(54) MULTIFLUID DETECTION AND TOTALIZATION IN A VORTEX FLOW METER

(71) Applicant: Micro Motion, Inc., Boulder, CO (US)

(72) Inventors: Jeffry D. Foster, St. Louis Park, MN (US); Randy K. Paschke, Golden Valley, MN (US)

(73) Assignee: Micro Motion, Inc., Boulder, CO (US)

( * ) Notice: Subject to any disclaimer, the term of this patent is extended or adjusted under 35 U.S.C. 154(b) by 338 days.

(21) Appl. No.: 18/068,042

(22) Filed: Dec. 19, 2022

(65) Prior Publication Data

US 2024/0200993 A1 Jun. 20, 2024

(51) Int. Cl.
*G01F 1/32* (2022.01)
*G01F 15/06* (2022.01)
(Continued)

(52) U.S. Cl.
CPC .......... *G01F 1/3209* (2013.01); *G01F 15/065* (2013.01); *G01F 15/0755* (2013.01); *G01N 9/32* (2013.01)

(58) Field of Classification Search
CPC ........ G01F 1/3209; G01F 1/74; G01F 15/065; G01F 15/0755; G01N 9/32
See application file for complete search history.

(56) References Cited

U.S. PATENT DOCUMENTS 5,942,696 A   8/1999   Kleven
8,596,141 B2  12/2013  Konyukhov et al.
(Continued)

FOREIGN PATENT DOCUMENTS

JP   H07270203 A   10/1995
JP   2002082098 A   3/2002

OTHER PUBLICATIONS

International Search Report and Written Opinion for PCT Application PCT/US2023/083316, dated May 2, 2024, 11 pages.
(Continued)

*Primary Examiner* — Kristina M Deherrera
*Assistant Examiner* — Gedeon M Kidanu
(74) *Attorney, Agent, or Firm* — Christopher R. Christenson; Kelly, Holt & Christenson, P.L.L.C.

(57) ABSTRACT

A vortex flow includes a flowtube configured to receive a flow of process fluid. A shedder bar is disposed within the flowtube and is configured to generate vortices in the flow of process fluid. A vortex sensor is disposed to sense vortices in the flow of process fluid generated by the shedder bar. Measurement electronics are operably coupled to the vortex sensor and are configured to detect an analog signal of the vortex sensor and provide a digital indication relative to the analog signal of the vortex sensor. A processor is configured to receive the digital indication and calculate velocity of the process fluid flow based on a frequency of the digital indication. The processor is also configured to measure an amplitude of the digital indication and estimate density of the process fluid based on the measured amplitude. The processor is further configured to determine a fluid type based on the measured amplitude and assign a unit of flow corresponding to the calculated velocity to a fluid totalizer corresponding to the detected fluid type.

20 Claims, 7 Drawing Sheets

(51) Int. Cl.
*G01F 15/075* (2006.01)
*G01N 9/32* (2006.01)

(56) References Cited

U.S. PATENT DOCUMENTS

| | | | | |
|---|---|---|---|---|
| 8,844,371 | B2* | 9/2014 | Limacher | G01F 1/3209 |
| | | | | 73/861.04 |
| 9,016,138 | B2* | 4/2015 | Brand | G01F 1/32 |
| | | | | 73/861.22 |
| 10,365,134 | B2* | 7/2019 | Bogdanov | G01F 1/3209 |
| 2019/0348929 | A1* | 11/2019 | Paschke | G01F 15/063 |
| 2023/0374887 | A1* | 11/2023 | Jaaskelainen | E21B 41/0085 |

OTHER PUBLICATIONS

Rosemount-8600-Manual [online], Oct. 2016 [retrieved on Apr. 18, 2024]. Retrieved from the Internet: <URL: https://www.emerson.com/documents/automation/manual-vorlex-flow-meter-8600d-seriesrosemount-en-88578.pdf>, 130 pages.

* cited by examiner

MULTIFLUID DETECTION AND TOTALIZATION IN A VORTEX FLOW METER

BACKGROUND

The flow of a fluid through a pipe or conduit is often measured in order to control the flow and/or monitor the amount of fluid passing through the conduit. Various methods exist for measuring flow of fluid through a conduit. These methods include a measurement of differential pressure across a fluid flow obstruction, utilization of magnetic flow meter (magmeter), and utilization of a vortex flow meter. These various devices and technologies generally employ different techniques in order to sense aspects of the fluid flow. In some cases, fluid velocity is measured and sometimes mass flow is calculated as well.

Embodiments described below generally relate to flow meters, and in particular vortex flow meters. Vortex flow meters employ an operating principle based on the phenomenon of vortex shedding known as the von Karman effect. As fluid passes a bluff body or shedder bar, it separates and generates small eddies or vortices that are shed alternately along and behind each side of the bluff body. These vortices cause areas of fluctuating pressure that are detected by a sensor. The frequency of vortex generation is essentially proportional to fluid velocity. These vortices can be sensed by using a vortex oscillation plate.

SUMMARY

A vortex flow includes a flowtube configured to receive a flow of process fluid. A shedder bar is disposed within the flowtube and is configured to generate vortices in the flow of process fluid. A vortex sensor is disposed to sense vortices in the flow of process fluid generated by the shedder bar. Measurement electronics are operably coupled to the vortex sensor and are configured to detect an analog signal of the vortex sensor and provide a digital indication relative to the analog signal of the vortex sensor. A processor is configured to receive the digital indication and calculate velocity of the process fluid flow based on a frequency of the digital indication. The processor is also configured to measure an amplitude of the digital indication and estimate density of the process fluid based on the measured amplitude. The processor is further configured to determine a fluid type based on the measured amplitude and assign a unit of flow corresponding to the calculated velocity to a fluid totalizer corresponding to the detected fluid type.

DETAILED DESCRIPTION OF ILLUSTRATIVE EMBODIMENTS

Some process applications have multiple fluids that pass through a conduit at different times. Examples of such applications include plunger lift, water after gas carbon dioxide flooding, or steam cleaning of hydrocarbon flows in a chemical plant or refinery. In many of these applications, it can be helpful to have only one of the fluids measured, or to have the fluids measured in such a way that they totalize two separate totals.

Another challenge that may occur in process fluid flow sensing, is that sometimes during system manufacture or configuration, insufficient information is available regarding the actual fluid(s) that the flow meter will be measuring. Given this challenge, a vortex flow meter that could automatically detect the process fluid type (gas vs. liquid) and put the flow meter in a default setting for that type of process fluid, would provide significant value.

Vortex flow meters inherently measure the velocity of a fluid in a conduit by detecting the frequency of vortices shed from a shedder bar. The shedder bar also produces a density indication via the amplitude of the vortex shedding signal, which is directly proportional to the density and the velocity squared. Some embodiments described below employ the density measurement to differentiate between two fluids to allow a user to totalize only one of the fluids. This can be done using a simple density calibration at the manufacturer, or by providing the flow meter with expected densities or relative differences between the densities and letting the flow meter self-calibrate to the application.

As will be set forth in greater detail below, vortex flow meters in accordance with embodiments of the present invention may have options for a first fluid (fluid 1) and a second fluid (fluid 2) and have totalizers assignable to each fluid. In an example, case such as where the process application is plunger lift, expected fluid densities of 62.4 pounds per cubic feet and 0.75 pounds per cubic feet could be entered into the vortex flow meter or the vortex flow meter could be set to expect a generic gas and liquid as the two fluids. The vortex flow meter then measures the velocity of the fluid and the approximate density based on the frequency and amplitude of vortex shedding. The vortex flow meter then determines the fluid density based on the amplitude of the vortex sensor signal. Based on the fluid density, the vortex flow meter determines whether the fluid is a liquid or a gas. After determining if the fluid is a liquid or gas, the vortex flow meter assigns the measured flow to the totalizer assigned to that particular fluid.

Figure 1:
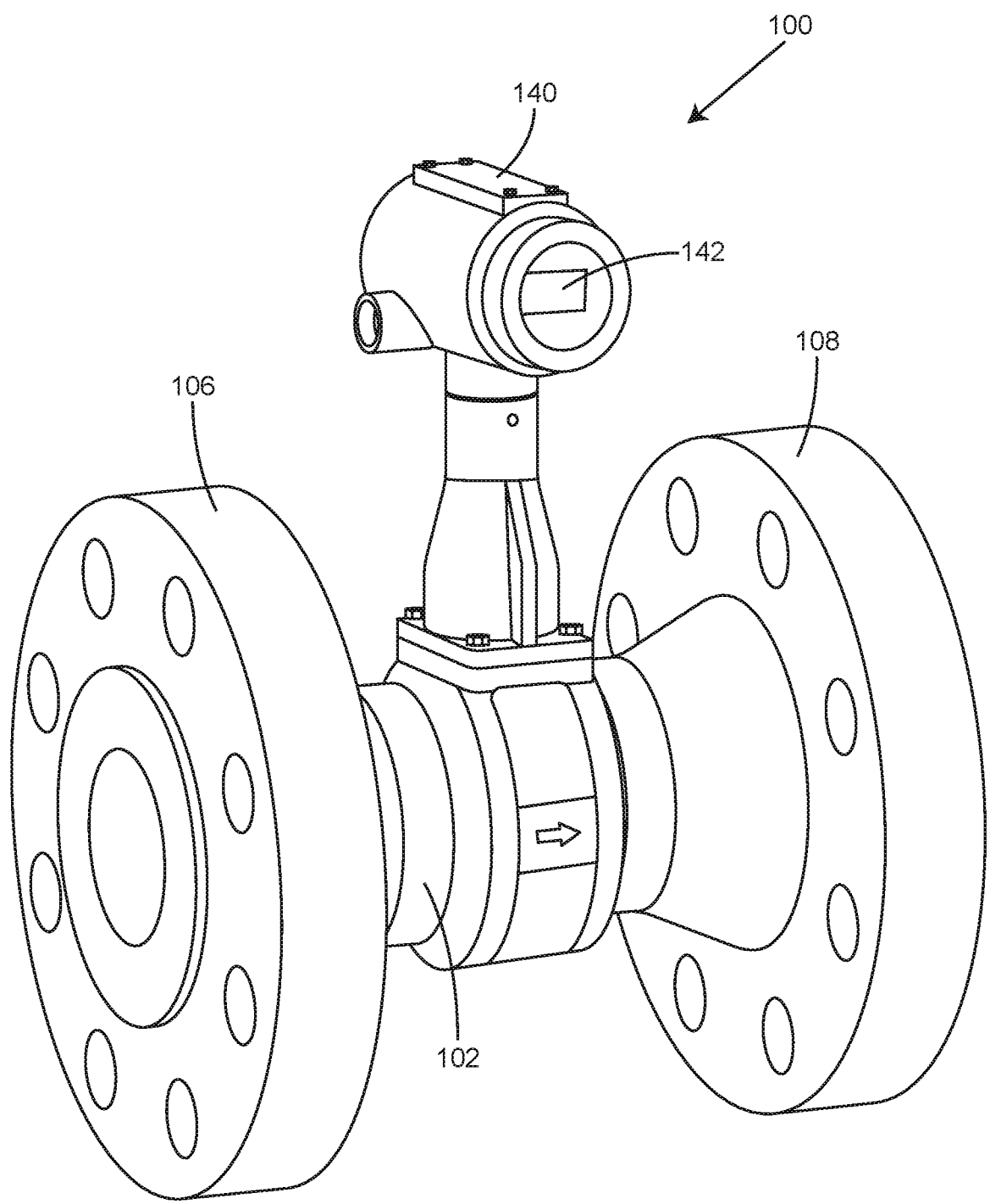
FIG. 1 is a diagrammatic perspective view of a vortex flow meter with which embodiments of the present invention are particularly applicable.

FIG. 1 is a diagrammatic perspective view of a vortex flow meter with which embodiments of the present invention are particularly applicable. Vortex flow meter 100 includes a flow tube 102 disposed between a pair of pipe flanges 106, 108, which are configured to mount to corresponding process piping. Vortex transmitter 140 is illustrated as being located above flow tube 102 and includes transmitter circuit 142 disposed therein. The transmitter circuit 142 is configured to sense vortices via a vortex sensor disposed within flow tube 102 and provide a flow output.

Figure 2:
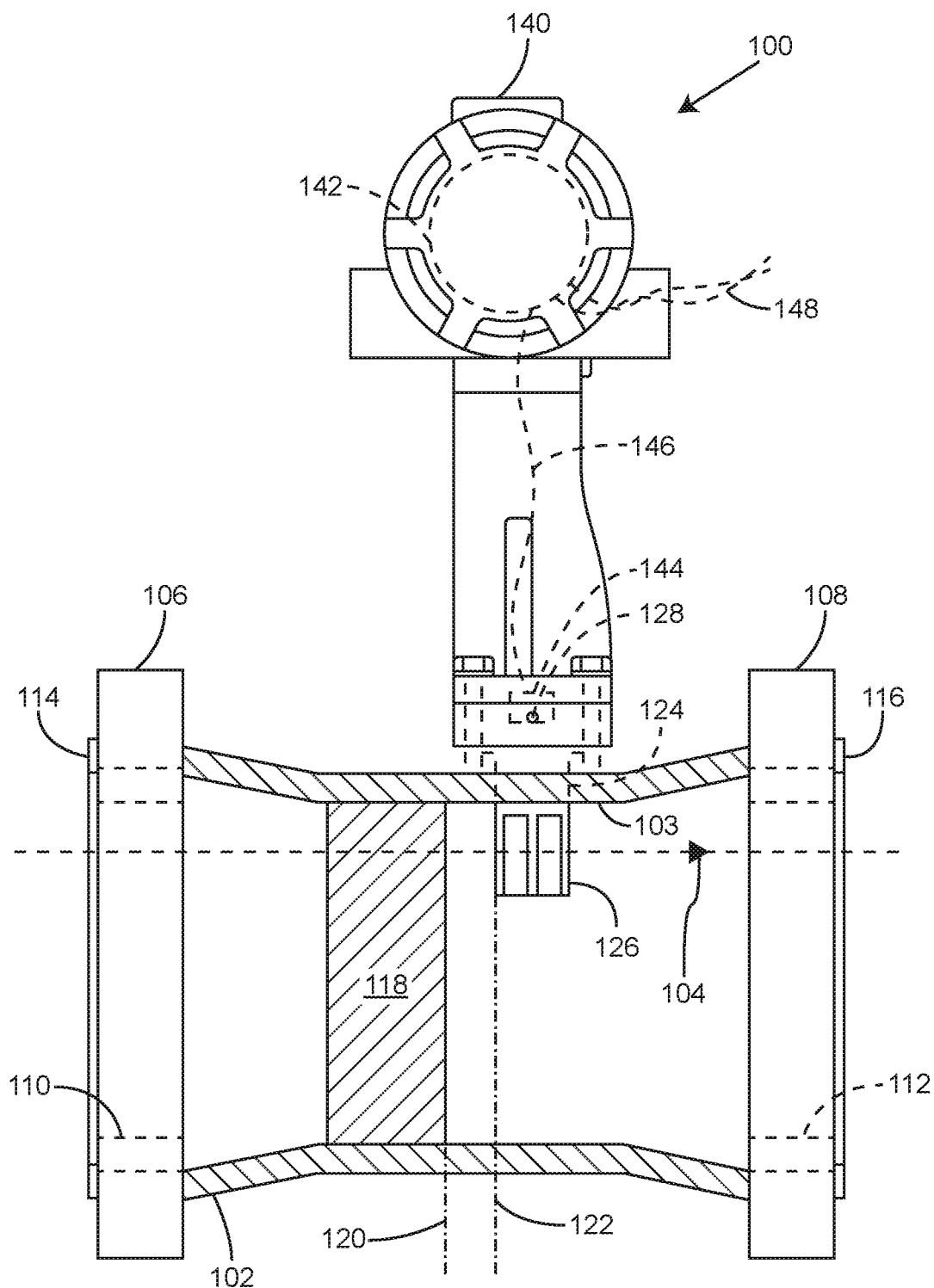
FIG. 2 illustrates a side sectional view of vortex flow meter.

FIG. 2 illustrates a side sectional view of vortex flow meter 100. The vortex flow meter 100 comprises a flow tube 102 for carrying a fluid flow 104 of a fluid through the flow tube 102. The flow tube 102 comprises a round cylindrical sidewall 103. The fluid flow 104 can comprise a liquid or a gas. Pipe flanges 106, 108 are joined to the flow tube 102. The pipe flanges 106, 108 include bolt holes such as bolt holes 110, 112 for mounting to a fluid piping system with bolts (not illustrated). The pipe flanges 106, 108 include sealing faces 114, 116 for sealing to mating flanges of the fluid piping system.

The vortex flow meter 100 comprises a vortex shedder bar 118 inside the flow tube 102. The vortex shedder bar 118 comprises a bluff body shape. The vortex shedder bar 118 is attached to the flow tube 102 at an upstream position 120. As the fluid flow 104 flows past the shedder bar 118, vortices are generated in the fluid flow 104. The vortices are referred to as a von Karman vortex street. The vortices are present as the fluid flow 104 passes a downstream position 122. The downstream position 122 is positioned downstream of the upstream position 120.

Flow tube 102 includes an opening 124 in sidewall 103. The vortex flow meter 10 comprises an apparatus 126 that passes through the opening 124. The apparatus 126 seals the opening 124 such that fluid in flow tube 102 does not leak out through the opening 124. The apparatus 126 extends into the fluid flow 104 and senses vortices at the downstream location 122. The apparatus 126 senses the vortices in the fluid flow 104 and transfers mechanical motion of the vortices to a position 128 that is outside the fluid flow 104. The apparatus 126 is not a part of the shedder bar 118. The apparatus 126 is spaced a distance downstream from the shedder bar 118.

The vortex flow meter 100 comprises a transmitter 140. The transmitter 140 comprises an electronic transmitter circuit 142 as well as a mechanical sensor 144 that senses the mechanical motion at the position 128 and that provides an electrical sensor signal representative of the mechanical motion. The mechanical sensor 144 is connected by leads 146 to provide the electrical sensor signal to electronic transmitter circuit 142. Electronic transmitter circuit 142 converts the electrical sensor signal to a standardized transmission signal provided to output leads 148. The electronic transmitter circuit 142 provides an output related to the fluid flow 104 through the flow tube 102, based upon sensed oscillations of the von Karman vortex street. The mechanical sensor 144 senses vortex oscillations at the sensing location 128 and provides a sensor output on leads 146. The electronic transmitter circuit 142 receives the sensor output from the mechanical sensor 144 and outputs the standardized transmission signal on output leads 148. According to one embodiment, the standardized transmission signal comprises a 4-20 milliampere, two-wire transmitter output signal. According to another embodiment, the 4-20 mA signal provides all of the energization for the electronic transmitter circuit 142 and the mechanical sensor 144. In such embodiment, lead 148 can comprise a two-wire process control loop in which the same two wires power the device and carry data.

Figure 3:
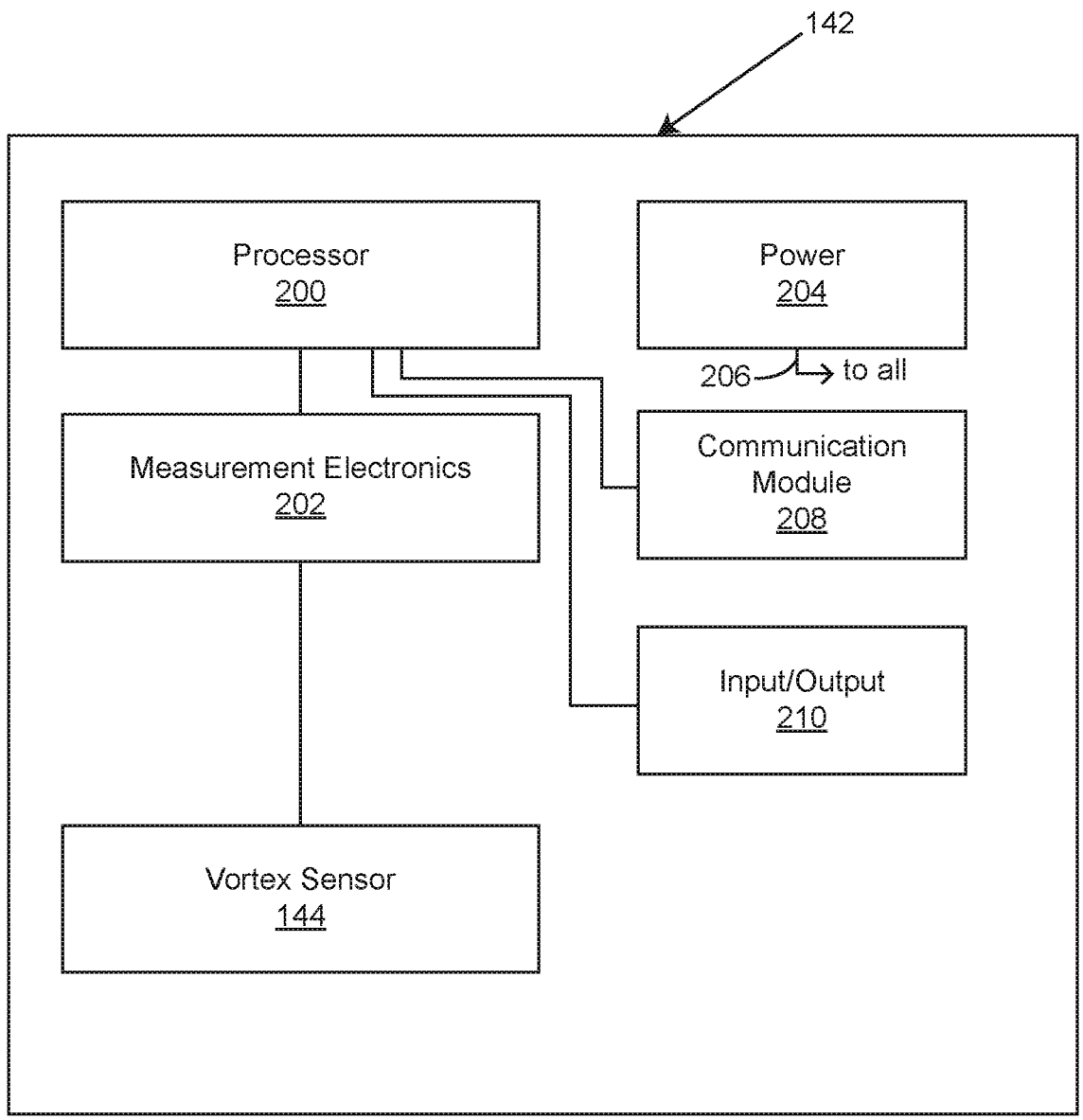
FIG. 3 is a block diagram of transmitter circuit 142 in accordance with an embodiment of the present invention.

FIG. 3 is a block diagram of transmitter circuit 142 in accordance with an embodiment of the present invention. As shown in FIG. 3, transmitter circuit 142 includes processor 200. Processor 200 may be any suitable device or logic that is configured to obtain one or more readings from measurement electronics 202 and provide a useful indication of process fluid flow. In one example, processor 200 is a microprocessor. Processor 200 may include, or be coupled to, measurement electronics 202 which are configured to sense an analog value, such as a voltage, and provide a digital indication thereof to processor 200. Measurement electronics 202 may include additional amplification, linearization and/or filtering circuitry, as desired. Measurement electronics 202 is electronically coupled to vortex sensor 144 and is configured to convert the electrical sensor signal to a digital signal for processing by processor 200.

FIG. 3 also illustrates transmitter circuit 142 including power module 204. Power module 204 is configured to provide suitable voltage levels and current protection to internal components of circuitry 142, as indicated by arrow 206. In embodiments where the vortex flow meter is wholly powered by the connectors through which it communicates, power module 204 may be configured to remove a selected amount of power, such as 4-20 mA, or energization of the internal components of circuitry 142.

Communication module 208 is coupled to processor 200 and is configured to communicate with at least one external device using a process industry standard communication protocol. Examples of such protocols include the Highway Addressable Remote Transducer (HART®) protocol, the FOUNDATION™ Fieldbus protocol, PROFIBUS, Modbus, and Controller Area Network (CAN). In one configuration, the communication loop is a wireless process control loop in which data is transmitted wirelessly, for example using radio frequency (RF) communication. One such wireless process communication protocol is the WirelessHART protocol (IEC 62591).

Transmitter circuit 142 also includes input/output module 210, which is configured to drive a local display, if provided, at the vortex flow meter. Additionally, input/output module 210 may include suitable circuitry for coupling to one or more user interface buttons or knobs to allow a user to interact with the transmitter circuitry 142 in the field.

Figure 4:
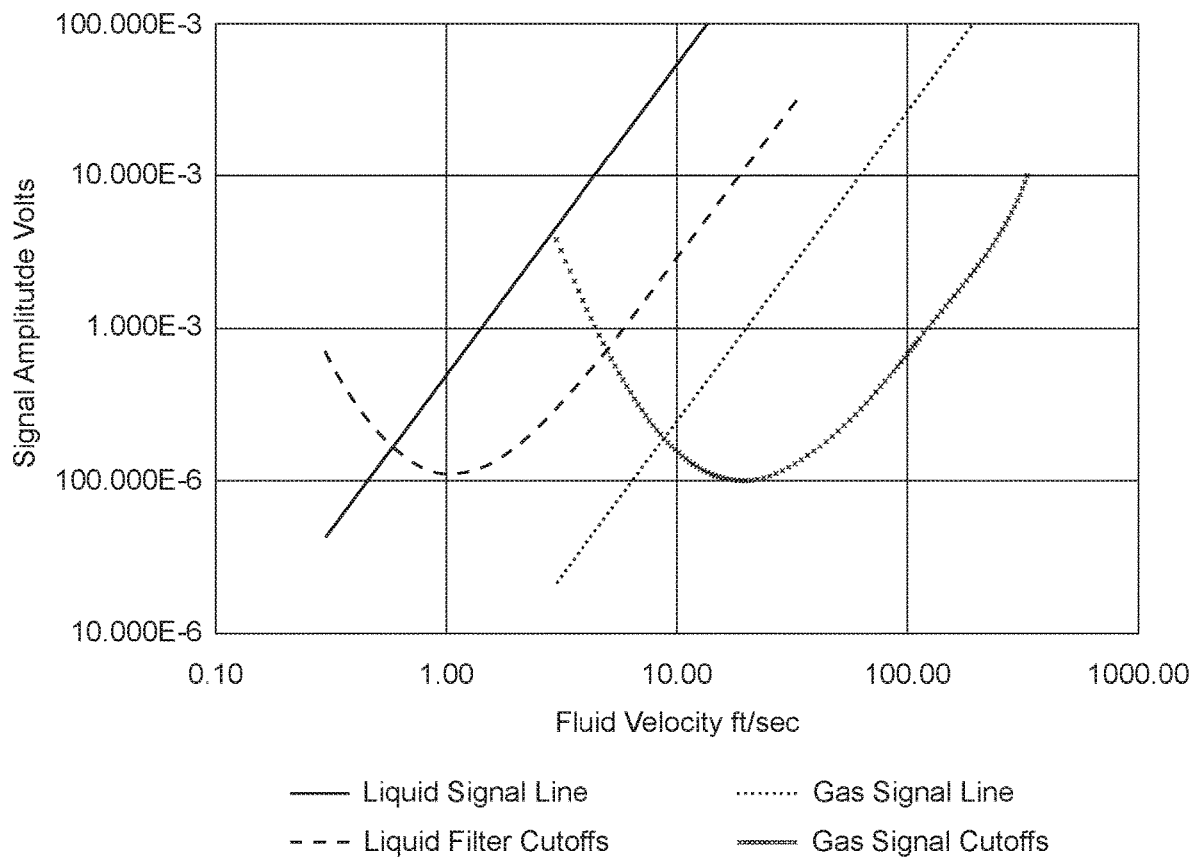
FIG. 4 is a graph showing the differences between gas and liquid filters and signals for a vortex flow meter in accordance with embodiments of the present invention.

FIG. 4 is a graph showing the differences between gas and liquid filters and signals for a vortex flow meter in accordance with embodiments of the present invention. As can be seen in FIG. 4, as the signal amplitude increases on any given velocity (which corresponds to frequency regardless of gas or liquid) there is a significant difference in the signal.

A method of measuring supercritical carbon dioxide and water injection would be similar. For example, in the Permian basin in West Texas and Eastern New Mexico, carbon dioxide having a density of about 50 pounds per cubic foot is injected into oil wells for enhanced oil recovery. After a few days, the process fluid is changed to water injection. While these densities are only different by 20%, on an oscilloscope, it is readily apparent which fluid is in the pipe. Accordingly, this determination can also be made to determine which fluid is passing through a vortex flow meter. Generally, switching from one fluid to another is a manual process, requiring the shutting off of one line and the opening of the other. In some cases, the control room may not know if the valve operator has made the switch, or may incorrectly believe that water is being pumped into the reservoir when in fact carbon dioxide is being injected. Employing embodiments described herein, using two independent totalizers, the control room could periodically read individual totalizer values via process communication and the control room would always have an accurate total of each fluid.

A method of measuring the density could employ either an absolute density or a relative density measurement. For the case of a gas and a liquid, it is likely that an uncalibrated sensor could be used to discern which fluid is flowing through the conduit, because while vortex sensors may have a variation of +/−30% from one sensor to another for the amplitude of the output signal for a given input, gas and liquid densities tend to differ by more than order of magnitude, and for a given sensor, the relative signal amplitudes reflect density to better than +/−5-7%. For a supercritical carbon dioxide/water mix, a calibration at the factory of the amplitude of the vortex signal for amplitude per fluid density may be helpful.

Alternately, a training mode can be employed in the vortex flow meter. During training, the vortex flow meter transmitter stores values for the expected density of each fluid. Once one cycle of each fluid passes through the vortex flow meter, the transmitter would know which fluid was which. Embodiments include other options as well. In still another potential embodiment, the user may provide the transmitter with information regarding which fluid was passing through the meter first, and the transmitter could then calibrate to that fluid. In still another option, requiring no user input, the transmitter would estimate the identity of the first fluid and then when the second fluid began passing through it, it would check whether that estimate was correct. In this mode, the first totalizer would by default be assigned to the higher density fluid, and the second totalizer would be assigned to the lower density fluid. In such a case, only one cycle of the first fluid could possibly be recorded incorrectly, at least temporarily, but could be switched by the vortex flow meter upon determining if the initial fluid was the lower density fluid.

Embodiments described herein can be implemented in code in order to create a user-friendly experience for users of the vortex flow meter. In one embodiment, the user is provided with a configurable section where they provide expected densities and fluid names. Assuming that the vortex flow meter is not calibrated, the average density could be measured and when the density changes the first time, the totalizers could be digitally reassigned. There would not need to be a set of fluids even to find, there could just be high and low density registers for the totalizers. This would potentially leave a period where one totalizer was not assigned, but presumably, the user would have an idea of what that total represented. This embodiment would provide minimal setup. For situations in which one fluid is liquid and one fluid is gas, there are some additional challenges with respect to filter settings. Currently, most vortex flow meters, require a user to decide if they want to measure gas or liquid, and the filters within the vortex flow meter are then adjusted by an order of magnitude with respect to frequency depending on which fluid is selected. This is based on earlier technology and processing speeds. With modern processing speeds, it is now possible to apply both a gas and liquid filter to copies of the vortex shedding signal data once it has been digitized. In this way, flow in either the gas or liquid regimes can be measured. For high velocity liquid flows, the gas filter settings still allow the flow meter to register flow. For this case, the flow meter will perform a density measurement to determine that the fluid is a liquid and reject it from totalizing in the gas setting.

Figure 5:
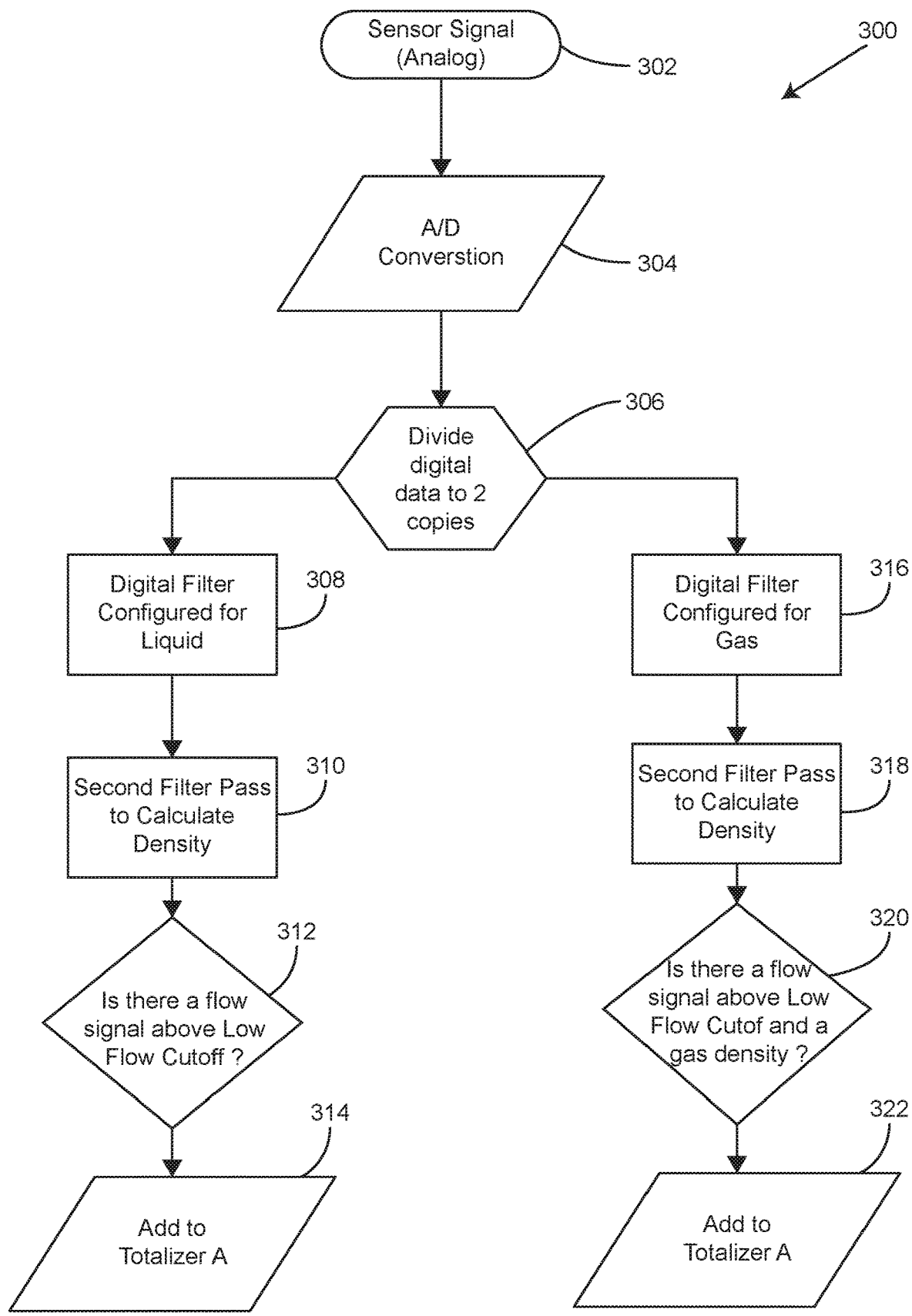
FIG. 5 is a flow diagram illustrating dual measurement filters being employed for gas and liquid flows in a vortex flow meter in accordance with an embodiment of the present invention.

FIG. 5 is a flow diagram illustrating dual measurement filters being employed for gas and liquid flows in a vortex flow meter in accordance with an embodiment of the present invention. Method 300 begins at block 302 where an analog sensor signal is received from a vortex sensor. This signal is provided to an analog-to-digital converter, which converts the analog indication to a digital representation thereof, as indicated at block 304. Next, at block 306, the digital data is copied into two copies. A first copy of the digital data is provided to a first digital filter that is configured for a liquid, as indicated at block 308. The second copy of digital data is provided to a second digital filter that is configured for gas, as indicated at block 316. Returning to block 308, once the digital filter has been applied to the digital data, the filtered output is conveyed to block 310, where a second filter pass is performed on the liquid-filtered data in order to calculate density. The output of the second filter pass is then tested at block 312 to determine if there is a flow signal that is above a low flow cutoff. If so, the flow signal is added to totalizer A as indicated at block 314.

Returning to block 316, after the gas-filtered digital data from block 316 is passed to block 318 where a second filter pass is performed in order to calculate density. The output from the second filter pass is tested, at block 320, to determine if there is flow above the low flow cutoff and a gas density. If so, control passes to block 322 where the flow signal is added to totalizer B. As can be appreciated, once these flow signals are added to their respective totalizers, the method iterates by obtaining another sensor signal at block 302. This type of configuration is useful for applications like plunger lift or a chemical plant where a hydrocarbon liquid may be followed by a steam flow.

For processes where the two fluids are liquids, the vortex transmitter would increment totalizer A or B based on a threshold density. The filters, in such instances, can be fixed in a liquid (or gas) mode, and the threshold could be determined either via user configuration or via an algorithm that determines the initial average density and calculates a threshold some safe distance away from that based upon an assumed device resolution.

Figure 6:
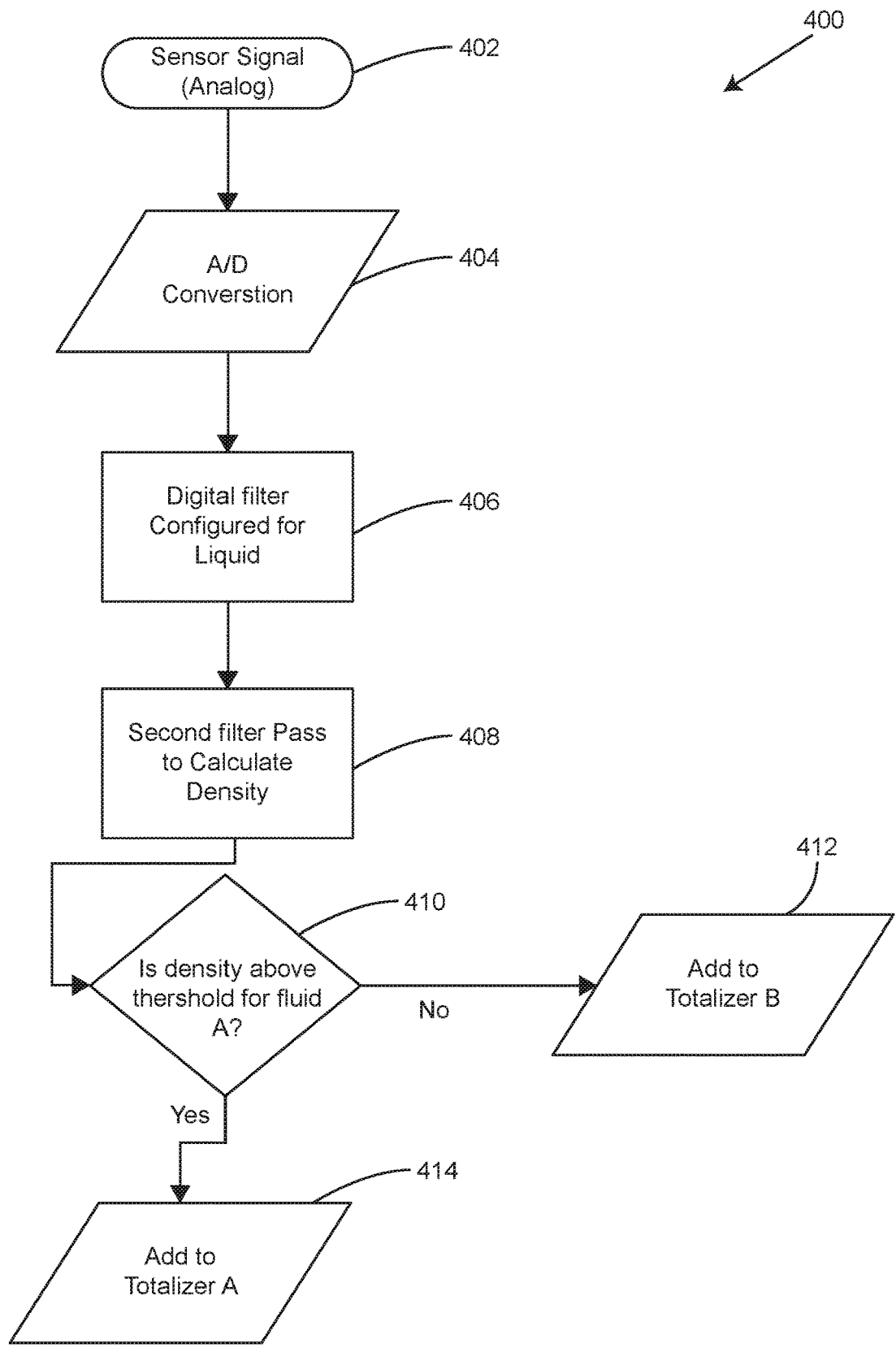
FIG. 6 is a flow diagram of a method of totalizing two fluids of different densities but having the same phase using a vortex flow meter in accordance with an embodiment of the present invention.

FIG. 6 is a flow diagram of a method of totalizing two fluids of different densities, but having the same phase using a vortex flow meter in accordance with an embodiment of the present invention. Method 400 begins at block 402 where an analog sensor signal is obtained from a vortex sensor. Once the analog signal has been obtained, it is provided to an analog-to-digital converter, which converts the analog signal to a digital representation thereof, as indicated at block 404. Next, at block 406, the digital representation of the vortex sensor signal is filtered using a filter that is configured for liquid. The output of the filter that is configured for a liquid is passed to block 408 where a second filter pass is obtained that calculates density. Next, at block 410, the density is tested to see if it is above the threshold for fluid A. If the density is not above the threshold for fluid A, control passes to block 412, where the flow signal is added to totalizer B. If, however, the density is above the threshold for fluid A, then control passes to block 414 where the flow signal is added to totalizer A. As with FIG. 5, method 400 iterates once the totalizer signals have been suitably incremented by obtaining another sensor signal at block 402.

As can be appreciated, multiple totalizer values are relatively easy to communicate and the vortex flow meter could communicate a digital signal using communication module 208 (shown in FIG. 3) to use process communication, or a local output, to provide a fluid label, either as fluid A and fluid B, gas and liquid, or user label 1 and user label 2, where these labels are input via process communication. In the case of analog readings of the flow value, the rate for each fluid could be sent via a 4-20 mA loop where the vortex flow meter is configured to output 12 mA as the 0 flow reading, one fluid indicated as 4-12 mA and a second fluid being indicated in the 12-20 mA range.

Figure 7:
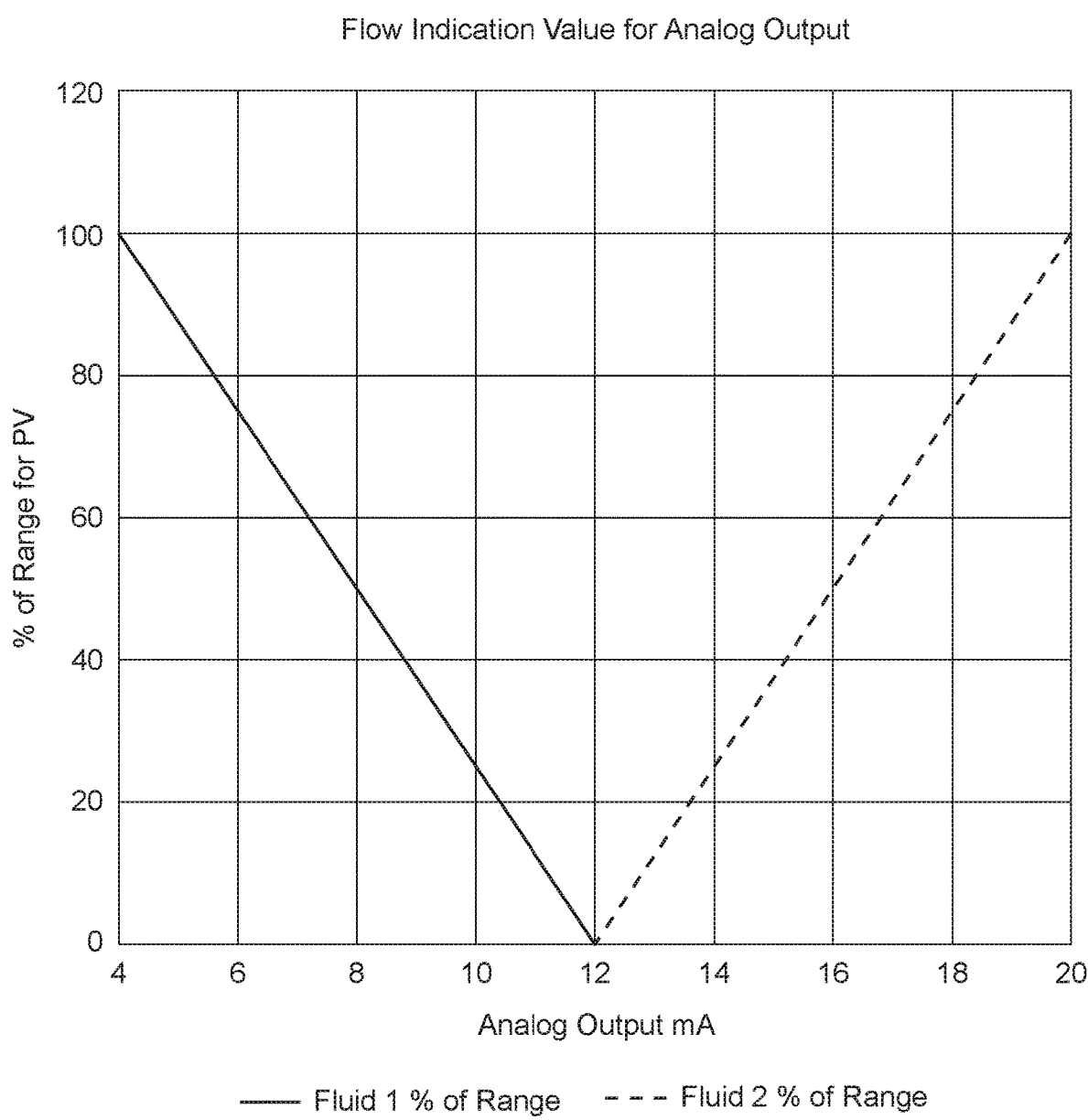
FIG. 7 is a diagrammatic view of a vortex flow meter using a 4-20 mA signal to convey flow values relative to a plurality of fluids over a signal 4-20 mA loop.

FIG. 7 is a diagrammatic view of a vortex flow meter using a 4-20 mA signal to convey flow values relative to a plurality of fluids over a single 4-20 mA loop. As can be seen in FIG. 7, a 12 mA signal represents 0 flow for either fluid. As the 4-20 mA signal decreases from the 12 mA value, the percent of range for fluid 1 increases linearly from 0 to 100%, at 4 mA. Similarly, as the 4-20 mA signal increases from 12 mA to 20 mA, the percent of range for fluid 2 increases linearly from 0% at 12 mA to 100% at 20 mA. While this regime would halve the precision of the rate from an analog perspective, this method of communication would be quite useful for users who do not have a digital communication capability in their control system.

While embodiments described above have been set forth with respect to a vortex flow meter that can measure two different fluids where one is gas and another is liquid, those skilled in the art will appreciate that embodiments are applicable to vortex flow meters that measure potentially more than three different fluids. Further, embodiments of the present invention can be practiced where the vortex flow meter measures one fluid, and detects whether it is a liquid or a gas and automatically configures to the detected fluid type. In the situation where a user does not provide initial configuration data, the signal could be split as shown in FIG. 7, and once the fluid type, liquid or gas, is determined by the vortex flow meter registering a sustained period of one fluid type, the vortex flow meter could so configure itself to measure that single fluid type by turning off signals that go through the alternate fluid type chain and configuring a single totalizer. In this instance, the vortex flow meter could be configured to a default 4-20 mA setting based on velocity where 20 mA is the upper accuracy limit of the device. This would essentially provide a self-configuring vortex flow meter.

Although the present invention has been described with reference to preferred embodiments, workers skilled in the art will recognize that changes may be made in form and detail without departing from the spirit and scope of the invention.

What is claimed is:

1. A vortex flow meter comprising:
    a flowtube configured to receive a flow of process fluid;
    a shedder bar disposed within the flowtube, the shedder bar being configured to generate vortices in the flow of process fluid;
    a vortex sensor disposed to sense vortices in the flow of process fluid generated by the shedder bar;
    measurement electronics operably coupled to the vortex sensor, the measurement electronics being configured to detect an analog signal of the vortex sensor and provide a digital indication relative to the analog signal of the vortex sensor;
    a processor configured to receive the digital indication and calculate velocity of the process fluid flow based on a frequency of the digital indication and measure an amplitude of the digital indication and estimate density of the process fluid based on the measured amplitude, the processor being configured to determine a fluid type based on the estimated density and assign a unit of flow corresponding to the calculated velocity to a fluid totalizer corresponding to the detected fluid type.

2. The vortex flow meter of claim 1, wherein the processor is separate from and coupled to the measurement electronics, the measurement electronics including an analog-to-digital converter.

3. The vortex flow meter of claim 1, and further comprising a communication module coupled to the processor, the communication module being configured to communicate in accordance with a process industry standard communication protocol.

4. The vortex flow meter of claim 3, wherein the communication module is configured to communicate totalizer information.

5. The vortex flow meter of claim 4, wherein the totalizer information includes a plurality of totalizer values, each totalizer value corresponding to a different process fluid.

6. The vortex flow meter of claim 5, wherein a first totalizer value totalizes a process liquid flow, and a second totalizer value totalizes a process gas flow.

7. The vortex flow meter of claim 5, wherein a first totalizer value totalizes a first process liquid flow and a second totalizer value totalizes a second process liquid flow, wherein the first and second process liquids have different densities, and wherein the processor is configured to apply a density threshold value to identify process liquid flow relative to the first and second process liquids.

8. The vortex flow meter of claim 5, wherein the communication module is configured to communicate digitally.

9. The vortex flow meter of claim 5, wherein the communication module is configured to generate a single 4-20 milliamp signal indicative of flow two different process fluids.

10. The vortex flow meter of claim 1, wherein the processor is configured to apply a first digital filter to the digital indication, the first filter being configured for detection of process liquid flow.

11. The vortex flow meter of claim 10, wherein the processor is further configured to apply a second digital filter to the digital indication, the second digital filter being configured for detection of process gas flow.

12. A method of detecting process fluid flow using a vortex flow meter, the method comprising:
    receiving an analog signal from a vortex sensor;
    digitizing the analog signal from the vortex sensor to generate a first digital indication of the analog signal;
    copying the first digital indication to generate at least one additional digital indication of the analog signal;
    applying a first digital filter to the first digital indication, the first digital filter being configured for detection of process liquid, wherein a result of the first digital filter is used to calculate density of the process liquid;
    applying a second digital filter to the at least one additional digital indication of the analog signal, the second digital filter being configured for detection of process gas, wherein a result of the second digital filter is applied to calculate density of the process gas;
    determine whether a liquid flow signal is above a low liquid flow cutoff and selectively add a unit of flow to a liquid flow totalizer if the liquid flow signal is above the low liquid flow cutoff;
    determine whether a gas flow signal is above a low gas flow signal cutoff and selectively add a unit of flow to a gas flow totalizer if the gas flow signal is above the low gas flow cutoff; and
    providing a process fluid flow output based on the liquid flow totalizer and the gas flow totalizer.

13. The method of claim 12, wherein process liquid density is calculated by applying a second liquid filter pass to the result of the first digital filter.

14. The method of claim 13, wherein process gas density is calculated by applying a second gas filter pass to the result of the second digital filter.

15. The method of claim 12, wherein providing a process fluid flow output includes generating a single 4-20 milliamp signal indicative to flow a two different process fluids.

16. The method of claim 15, wherein a single current value represents zero flow for both process fluids.

17. A method of detecting process fluid flow using a vortex flow meter, the method comprising:
- receiving an analog signal from a vortex sensor;
- digitizing the analog signal from the vortex sensor to generate a digital indication of the analog signal;
- applying a digital filter to the digital indication, the digital filter being configured for detection of process liquid, wherein a result of the digital filter is used to calculate density of the process liquid;
- comparing the calculated density to a density threshold value;
- adding a unit of flow to a first liquid flow totalizer if the calculated density is above the density threshold value;
- adding a unit of flow to a second liquid flow totalizer if the calculated density is below the density threshold value; and
- providing a process fluid flow output based on the first and second liquid totalizers.

18. The method of claim 17, wherein density of the process liquid is calculated by applying a second filter pass to the result of the digital filter.

19. The method of claim 17, wherein providing the process fluid flow output includes generating a single 4-20 milliamp signal indicative to flow a two different process fluids.

20. The method of claim 17, wherein the method is iterated.

* * * * *